United States Patent
Ponce (10) Patent No.: US 8,175,568 B2
(45) Date of Patent: May 8, 2012

(54) METHOD OF IMPROVING BATTERY LIFE

(75) Inventor: Robert A. Ponce, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 12/409,804

(22) Filed: Mar. 24, 2009

(65) Prior Publication Data

US 2010/0248677 A1    Sep. 30, 2010

(51) Int. Cl.
*H04B 1/16*    (2006.01)

(52) U.S. Cl. .................................. 455/343.5; 455/343.2

(58) Field of Classification Search ..... 455/343.1–343.6
See application file for complete search history.

(56) References Cited

U.S. PATENT DOCUMENTS

| | | | |
|---|---|---|---|
| 6,298,221 B1 | 10/2001 | Nguyen | |
| 6,311,048 B1 | 10/2001 | Loke | |
| 6,801,760 B2 | 10/2004 | Hutchison | |
| 7,130,602 B2 * | 10/2006 | Ciccarelli | ................. 455/240.1 |
| 7,660,569 B2 | 2/2010 | Xiong | |
| 7,696,828 B2 * | 4/2010 | Chang | ........................... 330/311 |
| 7,911,269 B2 * | 3/2011 | Yang et al. | ...................... 330/51 |
| 2004/0038656 A1 | 2/2004 | McCall et al. | |
| 2005/0026564 A1 | 2/2005 | Haub et al. | |
| 2007/0033618 A1 * | 2/2007 | Kiukkonen et al. | ............ 725/62 |
| 2008/0057883 A1 * | 3/2008 | Pan | ........................... 455/127.1 |

FOREIGN PATENT DOCUMENTS

| | | |
|---|---|---|
| EP | 0999649 A2 | 5/2000 |
| WO | WO2006018759 | 2/2006 |
| WO | WO2008106354 | 9/2008 |

OTHER PUBLICATIONS

International Search Report—PCT/US2010/028522—International Search Authority, European Patent Office, Aug. 30, 2010.
Written Opinion—PCT/US2010/028522—ISA/EPO—Aug. 30, 2010.

* cited by examiner

*Primary Examiner* — Don Le
(74) *Attorney, Agent, or Firm* — Jimmy Cheng; Arnold J. Gum (57) ABSTRACT

The specification and drawing figures describe and show an apparatus, system and method of extending and improving battery life that includes identifying one or more parameters that affect linearity of a receiver, assigning the one or more parameters to one or more modes, and adjusting the linearity of the receiver based on the one or more parameters.

27 Claims, 6 Drawing Sheets

| MODE: PARAMETERS | HIGH LINEARITY | LOW LINEARITY |
|---|---|---|
| CHARGER PLUGGED IN (OR EXTERNAL POWER) | X | |
| E911 CALL IN-PROCESS | X | |
| <= 4 NAVIGATION SATELLITES BEING TRACKED | X | |
| >= 5 NAVIGATION SATELLITES BEING TRACKED | | X |
| AVERAGE OF SATELLITES TRACKED C/N GREATER THAN XdB | | X |
| DURING INITIAL NAVIGATION APPLICATION STARTUP | X | |
| AFTER LOCATION FIX OBTAINED | | X |
| NAVIGATION APPLICATION HIGH ACCURACY REQUEST | X | |
| NAVIGATION APPLICATION LOW ACCURACY SETTING | | X |
| HIGH DEVICE VELOCITY | X | |
| LOW DEVICE VELOCITY | | X |
| WITHIN XX METERS OF FINAL DESTINATION | X | |
| GENERAL / LARGE AREA LOCATION COARSE NAVIGATION | | X |
| FRIEND FINDER NAVIGATION APPLICATION WHEN WITHIN 50 M | X | |

METHOD OF IMPROVING BATTERY LIFE

FIELD OF TECHNOLOGY

The system, apparatus and method disclosed, illustrated and claimed in this document pertain generally to improving battery life. More particularly, the new and useful method of improving battery life is useful in connection with batteries used in mobile terminals equipped with satellite positioning capabilities.

BACKGROUND

Multiple functionalities are prevalent in personal portable and/or mobile wireless communications instruments (collectively in this document, "mobile terminals"). It is now common for a mobile terminal to include a satellite positioning system (SPS) such as a global positioning system (GPS). A GPS includes at least one receiver capable of receiving signals from satellites. A GPS receiver also includes radio frequency circuitry to receive position signals from a plurality of satellites. A GPS receiver also includes a power supply system. The power supply system includes at least one battery and an alternative external power connector for connecting a mobile terminal to an external power source. A GPS receiver also may include at least one microprocessor. The microprocessor includes at least one storage medium such as read-only memory (ROM). The microprocessor is operatively connectable to the circuitry and power supply system of the mobile terminal.

A GPS receiver is an electronics unit that receives and conditions a radio frequency (RF) input signal. A receiver may perform various types of signal conditioning such as low noise amplification, filtering, and related functions. Designing a receiver is challenging due to performance requirements, power consumption, and similar considerations. High performance is required to meet differing system specifications and/or to achieve performance criteria that change to meet different demands. Performance of a receiver may be characterized by various parameters. The parameters include at least linearity, dynamic range, and noise performance.

Linearity refers to the capability of a receiver to amplify a signal without generating a significant distortion. As disclosed in this document, linearity may be adjusted to improve battery life. Adjustment of linearity in a receiver used in a mobile terminal such as a cellular phone having GPS capability may extend battery life between recharges, which is highly desirable.

Unlike conventional digital receivers, an SPS receiver may be required to perform a variety of tasks requiring comparatively significant power use. Such tasks may include, for example, maintaining tables, monitoring satellite signals, and calculating varying positions of the mobile terminal and satellites. Preservation of battery life in a mobile terminal therefore is desirable.

Although a mobile terminal may be operatively connected to an external power source, preservation of battery life in a mobile terminal is desirable for a number of reasons. One reason is in anticipation of use of the internal battery of the mobile terminal when the mobile terminal is disconnected from an external power source. Another circumstance arises from a demand to maximize navigation performance whether the mobile terminal is connected to an external power source or is relying on the internal battery of the mobile terminal. Another circumstance arises from emergency use. Examples of emergency use include the need to maximize both navigation performance and communication performance during an urgent situation involving, for example, 911 transmissions, an avalanche alert, and similar emergencies. In such cases the emergency will take precedence over considerations of battery life. However, the more that battery life is preserved during use, the better the chances of coping with such emergencies, especially under circumstances in which recharging may not be an immediate option.

At least one solution proposed for extending battery life of a mobile terminal is to automatically switch a navigation receiver to low linearity if the transmitter power drops below a preset or preprogrammed value or threshold. A limitation of that approach is that it does not factor into consideration the multiplicity of functionalities, tasks and unanticipated demands that may arise in connection with the use of a mobile terminal equipped with GPS capabilities.

A need exists in the industry, therefore, for a new, useful and improved method of improving and extending battery life that is capable of using a number of operational factors and parameters to adjust receiver linearity so as to improve and extend battery life.

SUMMARY

The method of improving battery life disclosed, illustrated, and claimed in this document address the above-stated needs by dynamically adjusting receiver linearity based on one or more operational parameters. More specifically, the specification and drawing figures describe and show an apparatus, system and method of extending and improving battery life that include identifying one or more parameters that affect linearity of a receiver, assigning the one or more parameters to one or more modes, and adjusting the linearity of the receiver based on the one or more parameters.

It will become apparent to one skilled in the art that the claimed subject matter as a whole, including the structure of the apparatus, and the co-operation of the elements of the apparatus, combine to result in a number of unexpected advantages and utilities. The structure and co-operation of structure of the method of improving battery life will become apparent to those skilled in the art when read in conjunction with the following description, drawing figures, and appended claims.

The foregoing has outlined broadly the more important features of the invention to better understand the detailed description that follows, and to better understand the contributions to the art. The method of improving battery life is not, however, limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the method of improving battery life, which is measured by the claims, nor intended to limit the scope of the claims. The novel features of the method of improving battery life are best understood from the accompanying drawing, considered in connection with the accompanying description of the drawing, in which similar reference characters refer to similar parts, and in which:

To the extent that the numerical designations in the drawing figures include lower case letters such as "a,b", such designations include multiple references, and the letter "n" in lower case such as "a-n" is intended to express a number of repetitions of the element designated by that numerical reference and subscripts.

DETAILED DESCRIPTION

Definitions

The term "mobile terminal" as used in this document means at least a mobile and/or portable wireless communications instrument capable of communication across a wireless communications system that, in general, includes an array of operatively connected communication devices adapted to receive and transmit at least electromagnetic signals across the system using infrared light and radio signals, and includes a telecommunications system in which electromagnetic waves, rather than some form of wire, carry the signal over all or part of the communication path. The mobile terminal may also receive and transmit signals from satellites, including satellites that are part of the Global Positioning System (GPS), Galileo, GLONASS, NAVSTAR, GNSS, a system that uses satellites from a combination of these systems, or any satellite positioning system subsequently developed (collectively referred to generally in this document as a Satellite Positioning System (SPS)). As used in this document, an SPS also includes pseudolite (pseudo-satellite) systems.

The term "terminal" in combination with the word "mobile" means at least a cellular phone, a pager, a satellite telephone, a two-way pager, a personal digital assistant (PDA) having wireless capabilities, a personal navigation device, a personal information manager (PIM), a portable computer having wireless capabilities, wireless local area networks, and any other type of wireless device having transmission capabilities that may also be one or more versions of a personal communications services device (PCS) including a time division multiple access ("TDMA"), a code division multiple access ("CDMA"), a Global System for Mobile communications ("GSM"), non-voice communications apparatus, and text transmission apparatus, among others. The term "mobile terminal" also includes devices that communicate with a personal navigation device (PND) such as by short-range wireless, infrared, wireline connection, or other connection, regardless of whether satellite signal reception, assistance data reception, and/or position-related processing occurs at the device or at the PND. The term "mobile terminal" also is intended to include all devices, including wireless communications devices, computers, laptops and similar devices that are capable of communication with a server, such as across the Internet, WiFi, or other network, and regardless of whether satellite signal reception, assistance data reception and/or position-related processing occurs at the device, at a server, or at another device associated with the network. Any combinations of the above also are considered a "mobile terminal."

The term "location" and "position" mean the physical and geographic location of one or more mobile wireless communications instruments or other devices determined by any technique, technology, or system, or any combination of techniques, technologies, or systems, known or as yet unknown, for determining location parameters. Currently, such techniques, technologies, and systems leverage the use of SPS systems, wireless wide area networks (WWANs), wireless local area networks (WLANs), wireless personal area networks (WPANs), combinations of the above, and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The term "wireless communications network" means a wireless communications system adapted to communicate with one or more mobile terminals, including as a nonexclusive example not only the QUALCOMM® QSHOP™ system, but also any communications system capable of associating geographical location data with a mobile wireless communications instrument, and of transmitting between such geographic locations data and information using SPS position-determination technology.

The term "instructions" means expressions that represent one or more logical operations. For example, instructions may be "machine-readable" by being interpretable by a machine for executing one or more operations or one or more data objects. However, this is merely an example of instructions, and the claimed subject matter is not limited in this respect. In another example, instructions may relate to encoded commands which are executable by a processing unit having a command set which includes the encoded commands. Such instructions may be encoded in the form of a machine language understood by the processing unit. Again, these are merely examples of instructions and the claimed subject matter is not limited in this respect.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

In one or more exemplary embodiments, the functions described may be implemented in hardware, software, firmware, or any combination thereof. If implemented in firmware and/or software, the functions may be stored as one or more instructions or code on a computer-readable medium. Examples include a computer-readable medium encoded with a data structure and a computer-readable medium encoded with a computer program. Computer-readable media includes physical computer storage media. Transmission media includes physical transmission media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The terms "processing," "computing," "calculating," "selecting," "forming," "enabling," "inhibiting," "locating," "terminating," "identifying," "initiating," "detecting," "obtaining," "hosting," "maintaining," "representing," "estimating," "reducing," "associating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in storage medium, for example. Such machine-readable instructions may comprise, for example, software or firmware stored in a storage medium included as part of a computing platform (e.g., included either as part of a processing unit or external to such a processing unit). Further, the process and method described in this document, with reference to flow diagrams or otherwise, may also be executed and/or controlled, in whole or in part, by such a computing platform.

The term "exemplary" means serving as an example, instance, or illustration; any aspect described in this document as "exemplary" is not intended to mean preferred or advantageous over other aspects of the method of improving battery life as described in this document.

DESCRIPTION

As indicated, a need exists in the industry for a new, useful and improved method of improving and extending battery life that is capable of using a number of operational parameters to adjust receiver linearity to improve and extend battery life such as a battery housed in a mobile terminal capable of multiple functionalities including communications, GPS, and an ever increasing number of functions.

Along with increased computing power, portability has become an important feature. Portability would be limited without the availability of portable and rechargeable power supplies. Accordingly, batteries have undergone significant advancement in storage capability, compactness, and other features.

Many portable electronic devices utilize rechargeable batteries such as, for example, sealed lead acid (SLA) batteries. Rechargeable batteries provide a number of advantages over disposable counterparts, including cost savings attributed to eliminating periodic replacement of spent batteries. Moreover, the use of rechargeable batteries also significantly reduces the disposal of batteries that may contain heavy elements not safely disposed of without significant cost and/or environmental impact.

Rechargeable batteries, however, have some limitations. Rechargeable batteries may become either over- or undercharged during a recharging phase due to insufficient control of the recharging process. Over- or undercharged batteries may lose their capacity quickly, thus requiring replacement and the consequent costs in acquiring the new battery and disposing of the old battery.

The technical problem solved by the method of improving battery life described in this document is to improve and extend battery life. At least one specific example of the technical problem to be solved is improvement of battery life in a mobile terminal, including a mobile wireless terminal, capable of communication across a wireless communications system, and also capable of location determination in connection with an SPS system. The solution to the problem is to provide for use of one or more operational parameters in different modes to adjust receiver linearity to improve and extend battery life.

A receiver that can provide acceptable performance with low power consumption is described in this document. The receiver may be a satellite positioning system (SPS) receiver used to condition signals received from satellites. The SPS receiver may be co-located with a transmitter, which may be transmitting at the same time that the SPS receiver is operating. Large output power from the transmitter may degrade the performance of the SPS receiver.

The SPS receiver may be operated in one of a plurality of modes, which may be associated with differently biased current settings for the SPS receiver. One of the modes may be selected based on an output power level of the transmitter. The SPS receiver may include at least one circuit with adjustable bias current, e.g., a low noise amplifier (LNA), a mixer, a local oscillator (LO) generator, etc. The bias current of each circuit block may be set in accordance with the selected mode.

Figure 1A:
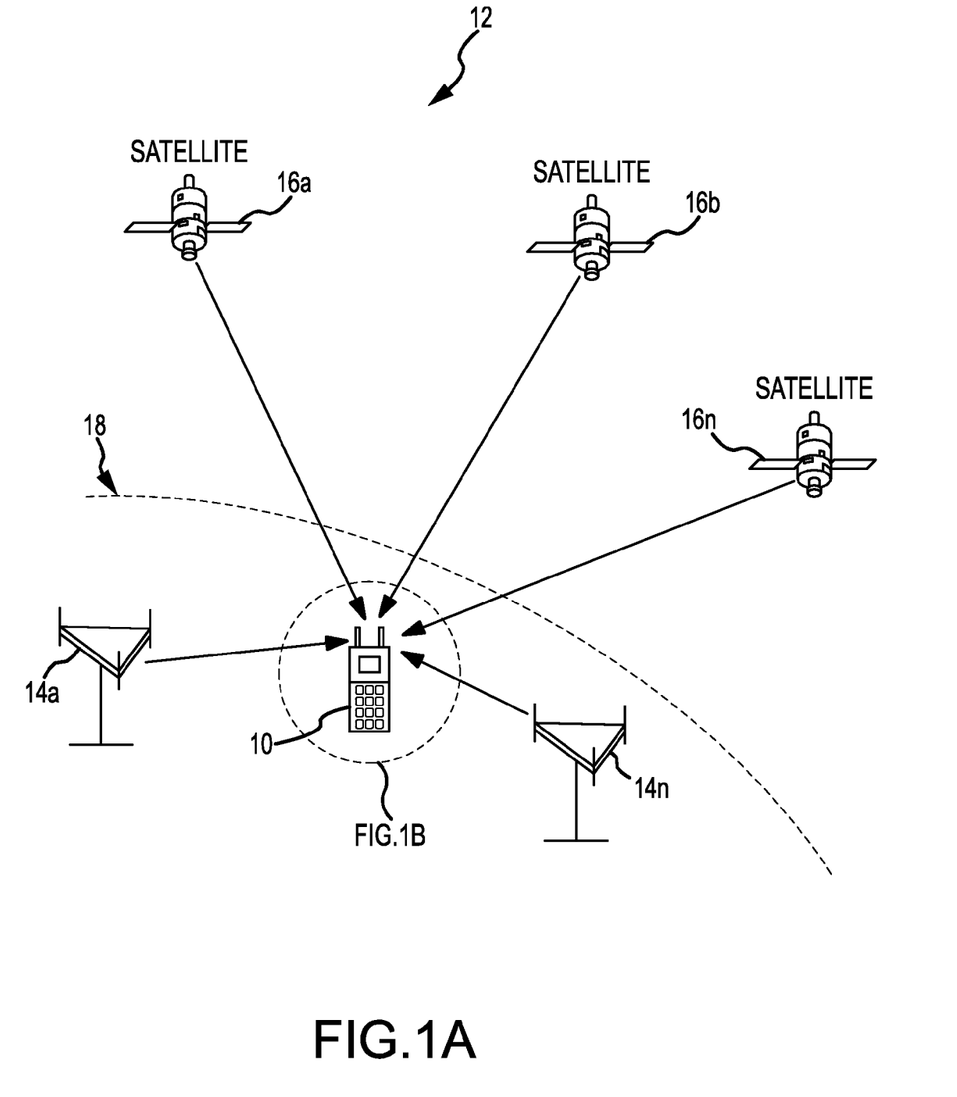
FIG. 1A of the drawing illustrates a mobile terminal capable of communicating across a wireless communications system and SPS.

Referring now to FIG. 1A, a mobile terminal 10 is illustrated. A person of skill in the art will appreciate that a plurality of mobile terminals 10 may include the same capabilities described in this document, and that FIG. 1A includes only one mobile terminal for ease of description. The mobile terminal 10 is capable of communicating across a wireless communications system 12. Mobile terminal 10 may be a cellular phone, a personal digital assistant (PDA), a handheld device, a wireless modem, a laptop computer, a cordless phone, among other devices described in this document. Mobile terminal 10 is capable of communicating with one or more base stations 14a-n in the wireless communications system 12. Mobile terminal 10 also is capable of receiving transmissions from one or more satellites 16a-n in an SPS system 18.

Figure 1B:
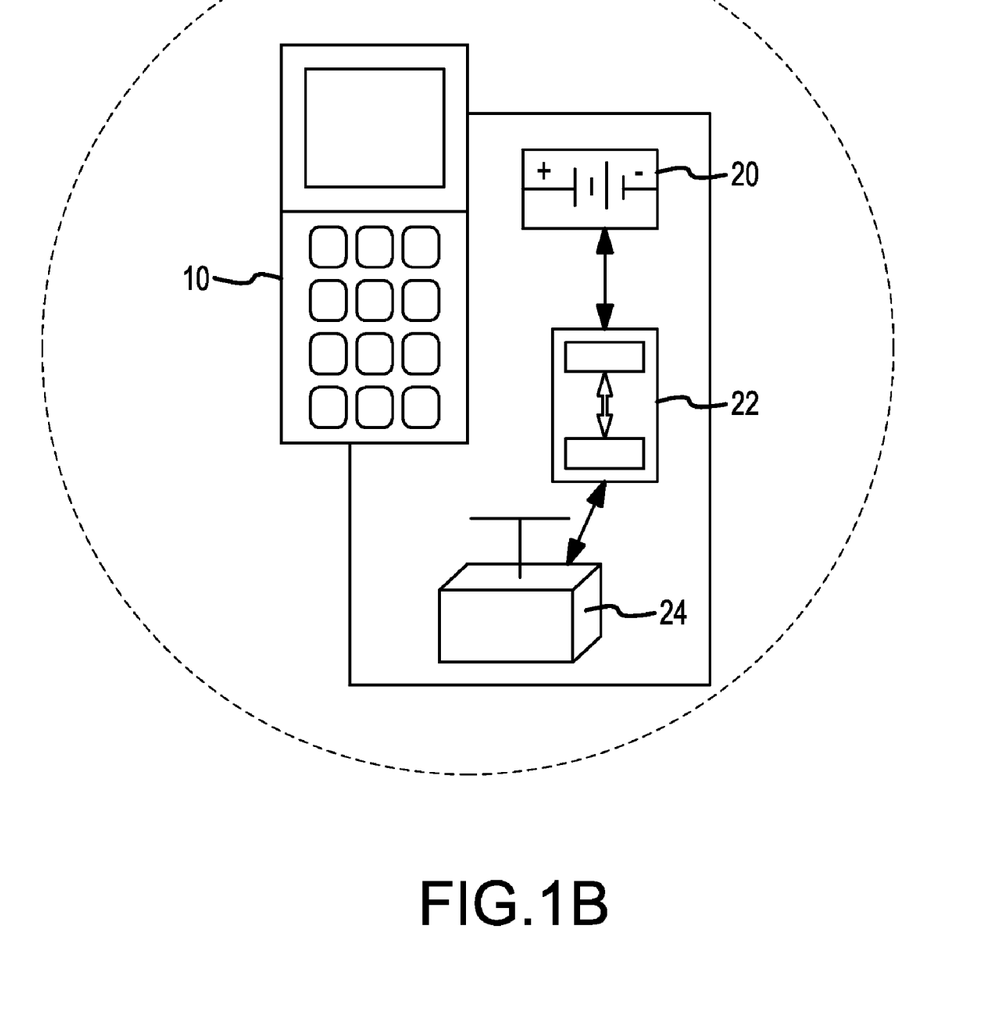
FIG. 1B is a blown-up illustration of the mobile terminal showing features that include a battery, a data processing system, and an SPS receiver.

FIG. 1B is a blown-up illustration of the mobile terminal 10 showing features diagrammatically that include a battery 20, a computer processing system 22 (more fully described with reference to FIG. 2, below), and an SPS receiver 24. As shown, the battery 20, computer processing system 22, and the SPS receiver 24 are included in the mobile terminal 10, and are operatively connectable to one another. As indicated in this document, it now is common for a mobile terminal to include support for a satellite positioning system (SPS) 18 such as a global positioning system (GPS), for example, SPS receiver 24 capable of receiving signals from satellites.

SPS receiver 24 is an electronics unit that receives and conditions a radio frequency (RF) input signal. Performance of receiver 24 may be characterized by various parameters, and, as disclosed in this document, adjusted to improve battery life.

Figure 2:
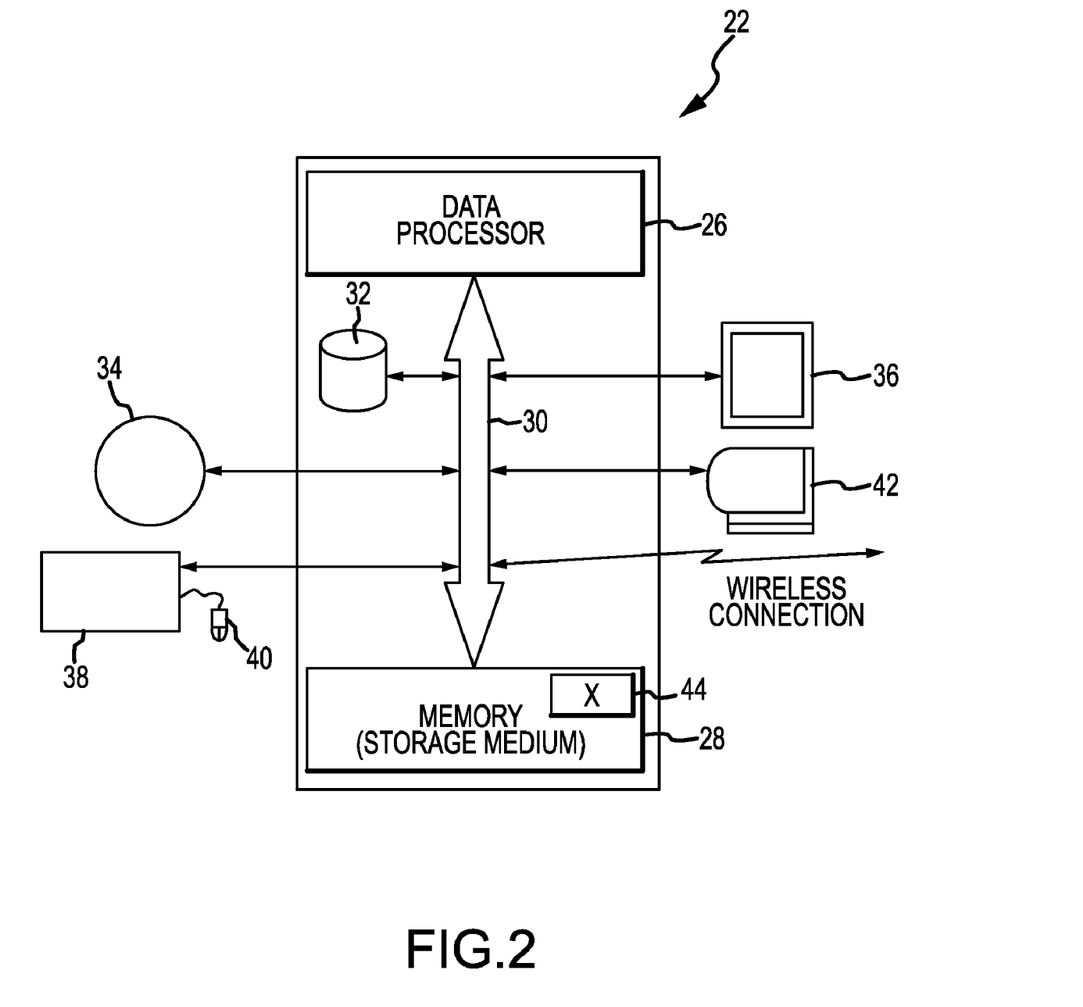
FIG. 2 illustrates a computer processing system associated with the mobile terminal.

FIG. 2 illustrates by cross-reference with FIGS. 1A-1B that the mobile terminal 10 includes at least one computer processing system 22. As shown, the computer processing system 22 is operatively connected to the mobile terminal 10. In one aspect, the computer processing system 22 is housed in the mobile terminal 10. The computer processing system 22 is adapted to receive, store, process, and execute instructions at least in connection with data and information about modes, linearity and parameters affecting battery life.

The computer processing system 22 of the mobile terminal 10 is illustrated in the block diagram of FIG. 2. As shown, the computer processing system may include a variety of components to enable the mobile terminal 10 to receive, process, store, and execute instructions in connection with data and information about modes, linearity and parameters affecting battery life. The components may include a data processor 26, a storage medium 28, the data processor 26 and storage medium 28 connected by a bus 30. Storage medium 28 may be a relatively high-speed machine-readable medium and may include volatile memories such as DRAM, and SRAM, as well as non-volatile memories such as ROM, FLASH, EPROM, EEPROM, and bubble memory. Also connectable to the bus 30 are optional secondary storage 32, external storage 34, output devices such as a monitor 36 that may be included with the mobile terminal 10 and, in optional configurations, an input device such as a keyboard 38, a mouse 40, and a printer 42. Secondary storage 32 may include machine-readable media such as a hard disk drive, a magnetic drum, and a bubble memory. External storage 34 may include machine-readable media such as a floppy disk, a removable hard drive, a magnetic tape, CD-ROM, and even other computers connected via a communications line. The distinction between secondary storage 32 and external storage 34 is primarily for convenience in describing the invention. As such, a person skilled in the art will appreciate that there is substantial functional overlap between and among the components. Computer software and user programs can be stored in software storage medium 28, secondary storage 32, and external storage 34. Executable versions of computer software can be read from storage medium 28 such as non-volatile storage medium, loaded for execution directly into volatile storage medium 28, executed directly out of non-volatile storage medium, or stored on the secondary storage 32 prior to loading into volatile storage medium for execution.

The computer processing system illustrated in FIG. 2 of the mobile terminal 10 includes a set of computer instructions 44 (also referred to as "instructions") for implementing the method of improving battery life 46 described in this document. The computer instructions 44 are illustrated in FIG. 2 diagrammatically solely as an aid in understanding the method of improving battery life. The instructions 44 may also be included in a computer processing system of a computer located at a base station 14a-n, and may be transmitted from a base station 14a-n to mobile terminal 10. Data associated with the instructions 44 may be received, stored, processed and transmitted among a plurality of mobile terminals 10 and a plurality of base stations 14a-n across the wireless communications system 12.

Those skilled in the art also will appreciate that the various illustrative logical blocks, modules, circuits, and algorithm steps described in connection with aspects of the invention disclosed in this document may be implemented as electronic hardware, computer software, or combination of both. To clearly illustrate this interchangeability of hardware and software, various illustrative and non-exclusive components, blocks, modules, circuits, and steps have been described in this document generally in terms of functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

Thus, the various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A data processor 26 may be a microprocessor, controller, microcontroller, or state machine. A processor also may be implemented as a combination of computing devices such as, in a non-exclusive example, a combination of a DSP and a microprocessor, a plurality of microprocessors, one or more microprocessors in conjunction with a DSP core, or any other such configuration.

Figure 3:
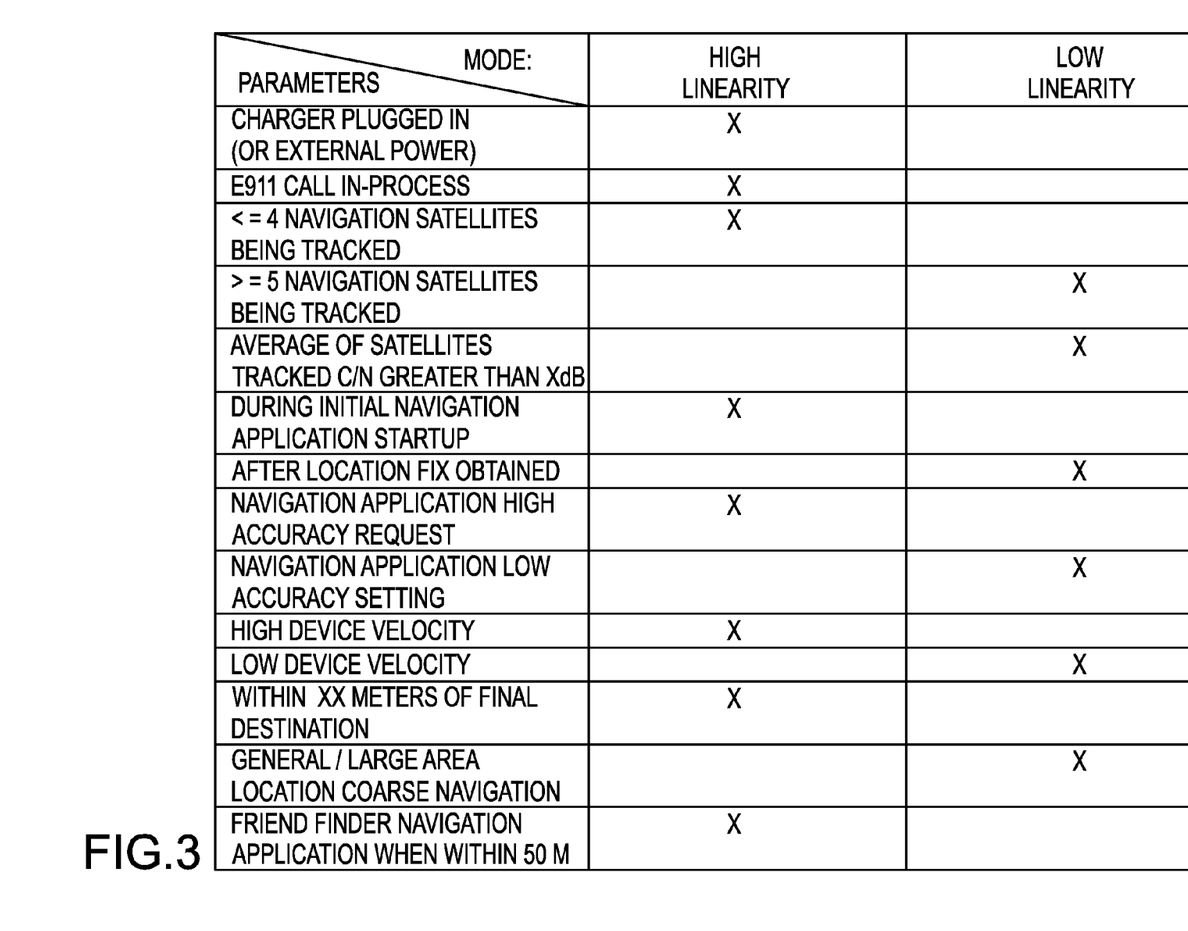
FIG. 3 illustrates a table showing modes and parameters for adjusting linearity of the SPS receiver that may be adjusted to extend the battery life.

FIG. 3 illustrates a table showing modes and parameters for adjusting linearity of the SPS receiver to adjust and extend the life of battery 20. FIG. 3 is illustrative of two modes of linearity of a receiver 24, as well as operational parameters that may be used to achieve the benefits of the method of improving battery life 46.

More specifically, as shown in FIG. 3, at least two modes of operation of the receiver are possible, namely (i) high linearity, and (ii) low linearity. In addition, FIG. 3 lists a variety of parameters. As shown, the parameters include considerations that include whether a battery charger (not shown) associated with the mobile terminal 10 is being energized by an external power source, in which case the receiver 24 enjoys high linearity. In event of an emergency situation involving, for example, a 911 call in process, it is also desirable for the receiver 24 to be functioning with high linearity. The number of navigation satellites 16a-n being tracked also affects linearity. As shown in FIG. 3, if, for example, four navigation satellites 16a-d are being tracked, it is desirable to operate the receiver 24 with high linearity. Alternatively, if five navigation satellites 16a-n are being tracked, low linearity is permissible, and the linearity of the receiver 24 having been adjusted to reflect the low linearity, the battery life is extended. In addition, as also illustrated in FIG. 3, another parameter is a function of the carrier-to-noise ratio related to satellites. The average of the satellites tracked may be determined along with their carrier-to-noise ratio ("C/N"). The C/N is measured in decibels ("dB"). The tabular indication of "X" in the table illustrated in FIG. 3 for low linearity would be the threshold in dB, or any other measurement of C/N or dB determined to be useful. Likewise, during an initial navigation application startup, as also shown in FIG. 3, high linearity is desirable. However, after location is fixed or obtained, the linearity of the receiver 24 may be adjusted to low linearity, and the life of the battery 20 will likewise be extended or improved. Likewise, the desired accuracy of the navigation application may affect linearity of the receiver 24. If a high accuracy is desired, high linearity is also necessary; alternatively, if low accuracy settings are permissible in a given application, then low linearity is acceptable, and the battery life can accordingly be adjusted and improved. Distance between the mobile terminal 10 and a final destination may also affect battery life. As shown in FIG. 3, when the mobile terminal 10 is functioning under SPS operations during which the final destination is in close proximity, high linearity is necessary; alternatively, if a general area location for navigation is being used, low linearity is permissible, and once again in the low linearity functioning mode, the battery life is extendable.

Figure 4:
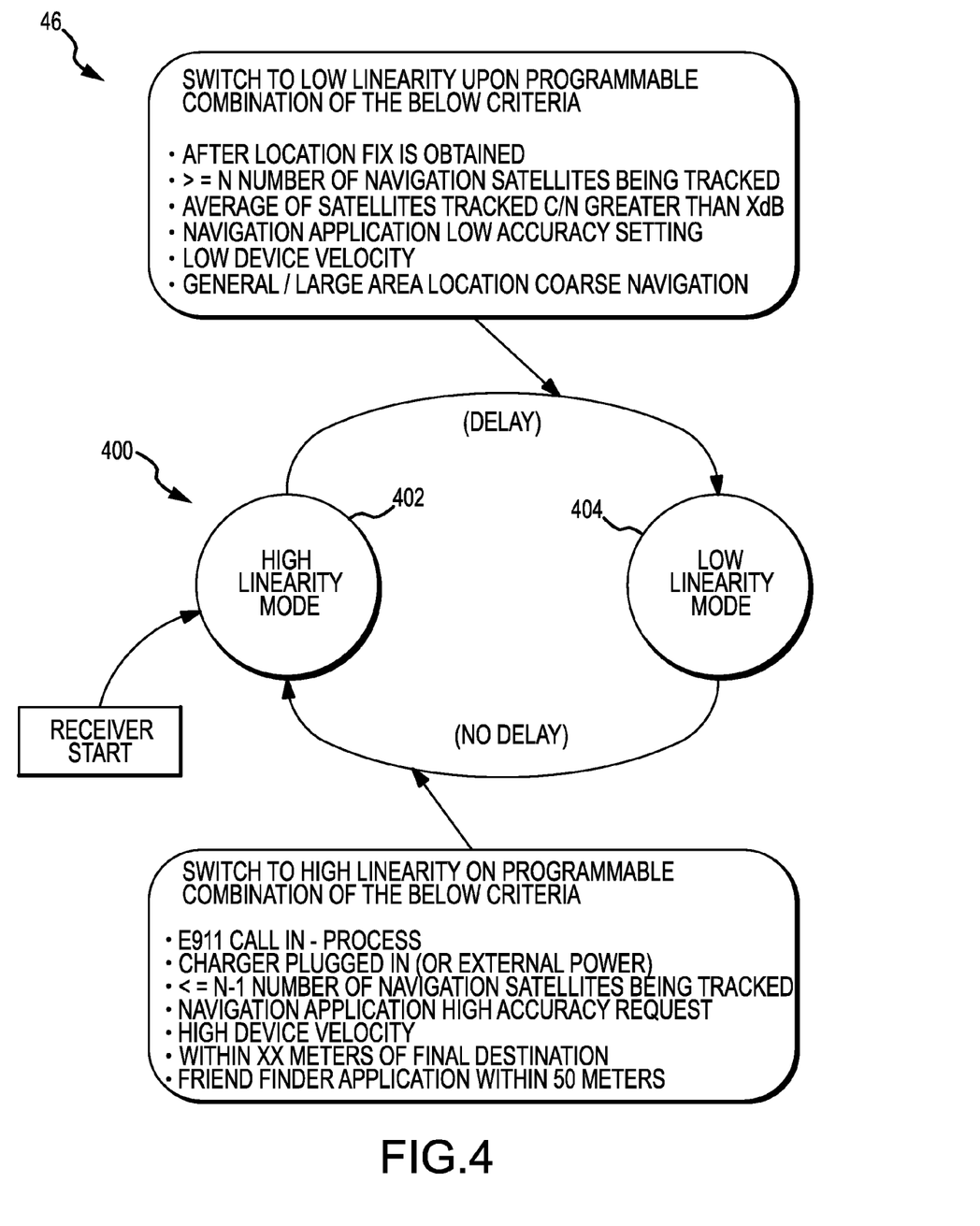
FIG. 4 is a diagrammatic illustration of a state machine showing implementation of various aspects of the method of improving battery life.

FIG. 4 is a diagram illustrating at least one aspect of the method of improving battery life 46. FIG. 4 is presented as a state machine 400 for operation of the receiver 24 associated with the battery 20 described in this document. The term "state machine" as used in this document means a diagrammatic illustration or model of behavior showing a number of states, transitions between those states, and actions. A state machine may include memory, a storage medium, a clock of some type, and components associated with processing units as described in this document. Accordingly, FIG. 4 presents a spectrum of possible changes over a time between a past event and a future event that if controlled or adjusted will help increase battery life.

Thus, as shown in FIG. 4, state machine 400 includes two states, a high linearity mode 402, and a low linearity mode 404. When the receiver is in operation, state machine 400 may start either in the high linearity mode 402 or the low linearity mode 404, but may switch between either mode 402-404 based on instructions 44 stored in the computer processing system 22. A processing unit such as a microprocessor may be configurable to use and apply timing delays for switching between one or more modes of linearity of the receiver. A processing unit such as a microprocessor may also be configurable to adjust bias current use of the battery as a function of the linearity of the receiver as changes occur in one or more modes of linearity of the receiver. The instructions 44 may cause the receiver 24 to switch to low linearity as a function of a programmable combination of one or more of the parameters shown in FIG. 4, including the time at which a location fix is obtained, the number of navigation satellites 16a-n being tracked, whether the navigation application requires only a low accuracy setting, the mobile terminal 10 is moving slowly in time and space, and the receiver 24 is required only to determine location within a general or large area location. Operation of the receiver 24 in a low linearity mode is conducive to improving and extending the life of the battery.

Other parameters that affect linearity may be adjusted during operation of the receiver 24 when high linearity is desirable. Such parameters include emergency calls, use of a charger to operate the receiver and to charge the battery, a lower number of navigation satellites 16a-n being tracked, a desire to achieve high accuracy in the navigation application, high velocity of movement in time and space of the mobile terminal 10, close proximity to a final destination, and a friend-finder application that is within a programmably adjustable distance of the friend.

Figure 5:
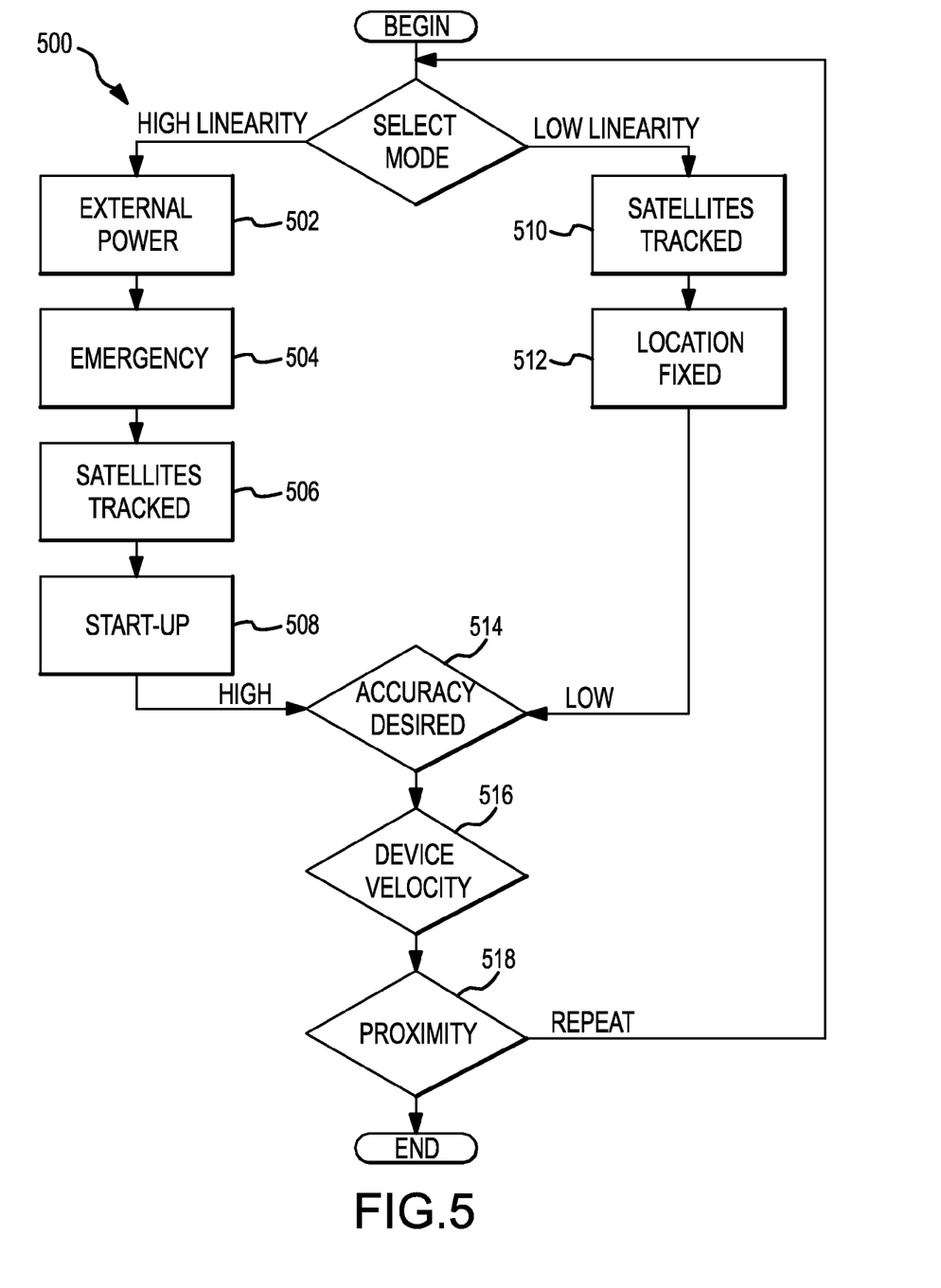
FIG. 5 is a flowchart showing one aspect of the method of improving battery life.

FIG. 5 is a flow chart 500 showing one aspect of the method of improving battery life 46. As shown in blocks 502-518, flow chart 500 illustrates in blocks 502-508 that a plurality of operational parameters that affect receiver linearity have been identified when a receiver 24 is operating in a mode of high linearity. Likewise, a plurality of operational parameters that affect receiver linearity in a low linearity mode have been identified in blocks 510-512. As indicated, it is possible to select one or more of the plurality of operational parameters based on at least one mode of linearity of the receiver 24. Likewise, it is possible to adjust receiver linearity as a function of the one or more of the plurality of operational parameters shown in the two modes of linearity of the receiver 24 in such a way that receiver battery life is improved and extended. Thus, during periods of high linearity demand on the receiver 24, such as functioning on external power sources as illustrated in block 502, the battery life can be extended by charging. Alternatively, during certain uses of the SPS system, a high linearity is necessary including, for example, use in emergency situations as shown in block 504, when the number of satellites 16a-n being tracked is under a minimum threshold as illustrated in block 506, and when the system is in startup mode as shown in block 508. In addition, as also illustrated in FIG. 3, another parameter is a function of the carrier-to-noise ratio related to satellites. The average of the satellites tracked may be determined along with their carrier-to-noise ratio ("C/N"). The C/N is measured in decibels ("dB"). The tabular indication of "X" in the table illustrated in FIG. 3 for low linearity would be the threshold in dB, or any other measurement of C/N or dB determined to be useful. Alternatively, the receiver may function in a low linearity mode, thus conserving battery life, when a number of satellites 16a-n exceeds a minimum threshold as shown in block 510, and also when location is substantially fixed as indicated by block 512.

High and low linearity is also a function of the accuracy desired as indicated in block 514. Likewise, the velocity of the mobile terminal also affects whether and to what extent the receiver must function in a high linearity or low linearity mode as indicated by block 516. And once again, the proximity of the mobile terminal to the desired geographical location also determines whether and to what extent high linearity and low linearity may be selected by the program included in the computer processor as illustrated in block 518. During operation, as indicated in flow chart 500, the program included with the computer processor may switch between high linearity and low linearity depending on the plurality of parameters shown in blocks 502 through 518 and repeated substantially continuously during operation.

The method, apparatus and system described in this document can be embodied in a number of ways and utilized in a number of environments. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the aspects and features is provided to enable any person skilled in the art to make or use the method of improving battery life. Various modifications will be readily apparent to those skilled in the art, and the principles described in this document may be applied to other aspects without departing from the spirit or scope of the invention. Thus, the description is not intended to limit the aspects but to be accorded the widest scope consistent with the principles and novel features disclosed herein.

Claim elements and steps in this document have been numbered solely as an aid in understanding the description. The numbering is not intended to, and should not be considered as intending to, indicate the ordering of elements and steps in the claims. In addition, drawing FIGS. 1A through 5, which illustrate at least one aspect of the method of improving battery life, are intended to be non-exclusive and merely illustrative of the disclosed embodiments.

Method steps may be interchanged sequentially without departing from the scope of the disclosure, and means-plus-function clauses in the claims are intended to cover the structures described as performing the recited function that include not only structural equivalents, but also equivalent structures.

What is claimed is:

1. A method, comprising:
   monitoring status of a plurality of parameters during operation of a Satellite Positioning System (SPS) receiver, the plurality of parameters comprising at least a number of satellites being tracked by the receiver and a current power source of the receiver;
   accessing data from a non-transitory medium indicating correspondences between respective status of the plurality of parameters, and a plurality of linearity modes in which the receiver can be operated; and
   determining a linearity mode from the plurality of linearity modes, in which to operate the receiver, according to the monitored status of the plurality of parameters, and the accessed data indicating correspondences between the status of the monitored parameters, and the plurality of linearity modes.

2. A method as recited in claim 1, further comprising starting the receiver in a high linearity mode prior to performing the determining.

3. A method as recited in claim 1, wherein the linearity modes comprise a high linearity mode and a low linearity mode, and the data accessed from the non-transitory medium indicates correspondences of parameter status to each of the high linearity mode and the low linearity mode.

4. A method as recited in claim 3, wherein parameter status corresponding to the high linearity mode comprises a number of satellites being tracked with a Carrier to Noise (C/N) metric greater than a threshold.

5. A method as recited in claim 3, wherein parameter status corresponding to the low linearity mode comprises that a relative low positional accuracy is currently required.

6. A method of extending receiver battery life, comprising:
   identifying a plurality of operational parameters of a device comprising a Satellite Positioning (SPS) receiver the plurality of operational parameters comprising whether location of the SPS receiver is determined, an accuracy of SPS operation required, and a speed of the SPS receiver;
   selecting one or more of the plurality of operational parameters; and
   adjusting receiver linearity as a function of the one or more of the plurality of operational parameters in such a way that the receiver battery life is extended.

7. A method of extending receiver battery life as recited in claim 6, further comprising switching from low receiver linearity to higher receiver linearity, responsive to determining that a location of the SPS receiver is not determined.

8. A method of extending receiver battery life as recited in claim 6, further comprising switching from high receiver linearity to lower receiver linearity, responsive to determining that a location of the SPS receiver has been determined.

9. A method of extending receiver battery life, comprising:
   identifying a plurality of operational parameters of a device comprising a Satellite Positioning (SPS) receiver;
   selecting one or more of the plurality of operational parameters; and
   adjusting receiver linearity as a function of the one or more of the plurality of operational parameters in such a way that the receiver battery life is extended wherein the plurality of operational parameters comprise
   a) whether the receiver battery is operatively connected to an external power source;
   b) whether an emergency communication is in process;
   c) the number of navigation satellites being tracked;
   d) whether the SPS receiver is in startup mode;
   e) whether location of the SPS receiver is determined;
   f) the accuracy of SPS operation required;
   g) the velocity of the SPS receiver;
   h) the distance between the SPS receiver and a destination;
   i) the average of satellites tracked using a Carrier to Noise (C/N) greater than a predetermined dB;
   j) whether a large area navigation of the SPS receiver is in operation; or
   k) whether a finder navigation application is imminent.

10. An apparatus, comprising:
    a wireless receiver;
    a battery operatively connected to the receiver;
    a microprocessor operatively connected to the receiver and to the battery capable of receiving, storing, executing, and transmitting instructions related at least to extending the life of the battery by controlling linearity of the receiver as a function of one or more parameters; and
    a storage medium operatively connected to the microprocessor, and storing data representative of the one or more parameters, wherein the one or more parameters are selectable from parameters comprising a) whether the receiver battery is operatively connected to an external power source;
b) whether an emergency communication is in process;
c) the number of navigation satellites being tracked;
d) the average number of navigation satellites tracked and the carrier-to-noise ratio of said average number of navigation satellites measured as a function of the decibel level;
e) whether the SPS receiver is in startup mode;
f) whether location of the SPS receiver is determined;
g) the accuracy of SPS operation required;
h) the velocity of the SPS receiver;
i) the distance between the SPS receiver and a destination;
j) whether a large area navigation of the SPS receiver is in operation; or
k) whether a finder navigation application is imminent.

11. An apparatus as recited in claim 10, wherein the microprocessor is capable of receiving, storing, and executing instructions related to selecting the one or more parameters as a function of one or more modes of linearity of the receiver.

12. An apparatus as recited in claim 10, wherein the receiver is an SPS receiver.

13. An apparatus as recited in claim 10, wherein the microprocessor is configurable to select one or more modes of linearity of the receiver as a function of the one or more parameters.

14. An apparatus as recited in claim 10, wherein the microprocessor is configurable to use and apply time delays for switching between one or more modes of linearity of the receiver.

15. An apparatus as recited in claim 10, wherein the microprocessor is configurable to adjust bias current use of the battery as a function of a linearity mode determined by a current status of the one or more parameters.

16. An apparatus as recited in claim 10, wherein the microprocessor is configurable to adjust bias current use of the battery to control linearity of the receiver as a function of the one or more parameters as changes occur in the one or more parameters.

17. An apparatus as recited in claim 12, wherein the SPS receiver is a GPS receiver.

18. An apparatus as recited in claim 10, wherein the receiver is mounted in a mobile terminal.

19. A non-transitory machine-readable medium comprising instructions for causing a machine to perform a process, a battery, the instructions comprising instruction for:
establishing a state machine comprising a plurality of states, each of the states assigned to a mode of linearity in which a wireless receiver can be operated, wherein a current state of the state machine is used in determining linearity of operation of one or more components of the wireless receiver;
identifying a plurality of operational parameters;
selecting one or more operational parameters of the plurality of operational parameters to be assigned to each state of the plurality of states;
selecting a next state of the state machine according to the selected one or more operational parameters assigned to the current state; and
determining linearity of operation of one or more components of the wireless receiver responsive to the selection of the next state.

20. A machine-readable medium comprising instructions that when executed by a machine, cause the machine to extend the life of a battery as recited in claim 19, the instructions further comprising instructions to adjust the linearity of the receiver as a function of the one or more parameters.

21. A machine-readable medium comprising instructions that when executed by a machine, cause the machine to extend the life of a battery as recited in claim 19, the instructions further comprising instructions to substantially continuously repeat the foregoing instructions.

22. A system for extending the life of a battery connected to an SPS receiver in a mobile terminal, the system comprising:
means for identifying a plurality of parameters that affect linearity of the SPS receiver; and
means for adjusting the linearity based on the plurality of parameters, wherein the plurality of parameters comprise
a) whether the receiver battery is operatively connected to an external power source;
b) whether an emergency communication is in process;
c) the number of navigation satellites being tracked;
d) the average number of navigation satellites tracked and the carrier-to-noise ratio of said average number of navigation satellites measured as a function of the decibel level;
e) whether the SPS receiver is in startup mode;
f) whether location of the SPS receiver is determined;
g) the accuracy of SPS operation required;
h) the velocity of the SPS receiver;
i) the distance between the SPS receiver and a destination;
j) whether a large area navigation of the SPS receiver is in operation; or
k) whether a finder navigation application is imminent.

23. A system for extending the life of a battery connected to an SPS receiver in a mobile terminal as recited in claim 22, further comprising means for indicating correspondences between the plurality of parameters to one or more modes of linearity of the receiver.

24. A system for extending the life of a battery connected to an SPS receiver in a mobile terminal as recited in claim 22, further comprising means for receiving, storing, executing, and transmitting instructions regarding the plurality of parameters.

25. A system for extending the life of a battery connected to an SPS receiver in a mobile terminal as recited in claim 22, further comprising means for receiving, storing, executing, and transmitting instructions regarding one or more modes of linearity of the SPS receiver.

26. A system for extending the life of a battery connected to an SPS receiver in a mobile terminal as recited in claim 22, wherein the means for identifying a plurality of parameters that affect linearity of the SPS receiver includes providing at least a table of the parameters on a non-transitory machine readable medium.

27. A method of extending wireless receiver battery life, comprising:
identifying a plurality of operational parameters of a wireless receiver to be used in selecting a linearity mode of the receiver from a plurality of linearity modes, the plurality of operation parameters identified as a function of at least
a) whether the receiver battery is operatively connected to an external power source;
b) whether an emergency communication is in process;
c) the number of navigation satellites being tracked;
d) whether the SPS receiver is in startup mode;
e) whether location of the SPS receiver is determined;
f) the accuracy of SPS operation required;
g) the velocity of the SPS receiver;

h) the distance between the SPS receiver and a destination;
i) the average of satellites tracked using a Carrier to Noise (C/N) ratio greater than a predetermined dB;
j) whether a large area navigation of the SPS receiver is in operation; or
k) whether a finder navigation application is imminent;

selecting one or more of the identified plurality of operational parameters based on at least a current linearity mode of the receiver; and adjusting receiver linearity as a function of the selected one or more operational parameters and the current linearity mode of the receiver in such a way that the receiver battery life is extended.

* * * * *